(12) United States Patent
Robinson (10) Patent No.: US 9,031,354 B2
(45) Date of Patent: May 12, 2015

(54) SYSTEM AND METHOD FOR POST-DETECTION ARTIFACT REDUCTION AND REMOVAL FROM IMAGES (75) Inventor: Ian S. Robinson, Redondo Beach, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 13/446,869

(22) Filed: Apr. 13, 2012

(65) Prior Publication Data

US 2013/0272626 A1  Oct. 17, 2013

(51) Int. Cl.
G06K 9/40 (2006.01)
G06K 9/00 (2006.01)
G06T 5/00 (2006.01)
G06K 9/32 (2006.01)

(52) U.S. Cl.
CPC .............. *G06K 9/0063* (2013.01); *G06T 5/002* (2013.01); *G06T 2207/10036* (2013.01); *G06T 2207/30181* (2013.01); *G06K 9/3241* (2013.01)

(58) Field of Classification Search
CPC ..................... G06T 9/008; G06T 2207/10036; G06T 7/0081; G06T 2207/30232; G01J 2003/2813; G01J 2003/2826
See application file for complete search history.

(56) References Cited

U.S. PATENT DOCUMENTS

| | | |
|---|---|---|
| 6,008,492 A | 12/1999 | Slater et al. |
| 6,075,891 A | 6/2000 | Burman |
| 6,504,943 B1 | 1/2003 | Sweatt et al. |
| 6,535,632 B1 | 3/2003 | Park et al. |
| 6,665,438 B1 | 12/2003 | Lin |
| 6,678,048 B1 | 1/2004 | Rienstra et al. |
| 6,701,021 B1 | 3/2004 | Qian et al. |
| 6,750,964 B2 | 6/2004 | Levenson et al. |
| 6,782,138 B1 | 8/2004 | Leisner et al. |
| 6,804,400 B1 | 10/2004 | Sharp |
| 6,859,275 B2 | 2/2005 | Fateley et al. |
| 6,940,999 B2 | 9/2005 | Lin |

(Continued)

FOREIGN PATENT DOCUMENTS

CN          101763445 A          6/2010

OTHER PUBLICATIONS

D. Manolakis et al., "Hyperspectral Image Processing for Automatic Target Detection Applications", 2003, MIT Lincoln Laboratory Journal, vol. 14, No. 1, pp. 79-115.*

(Continued)

*Primary Examiner* — Barry Drennan
*Assistant Examiner* — Guillermo Rivera-Martinez
(74) *Attorney, Agent, or Firm* — Burns & Levinson LLP; Joseph M. Maraia (57) ABSTRACT In accordance with various aspects of the disclosure, a system, a method, and computer readable medium having instructions for processing images is disclosed. For example, the method includes selecting, at an image processor, a region of a first image comprising a plurality of pixels. A mean value of pixels in the selected region is computed. From a plurality of sets of pixels in the region, a first subset of pixels in the region containing artifacts therein is selected. A value of each pixel in the first subset is compared with the mean value. The value of each pixel is adjusted based upon the comparing. The first image is reconstructed based upon the adjusted value of each pixel in the first subset, such that a variance of pixel values in the reconstructed image is lower than a variance of pixel values in the first image.

19 Claims, 7 Drawing Sheets (56) References Cited

U.S. PATENT DOCUMENTS

| | | | |
|---|---|---|---|
| 6,952,499 | B1 | 10/2005 | Vititoe |
| 7,180,588 | B2 | 2/2007 | Geshwind et al. |
| 7,194,111 | B1* | 3/2007 | Schaum et al. ............... 382/103 |
| 7,251,376 | B2 | 7/2007 | Qian et al. |
| 7,298,922 | B1* | 11/2007 | Lindgren et al. .............. 382/294 |
| 7,356,201 | B2 | 4/2008 | Gunther et al. |
| 7,463,778 | B2 | 12/2008 | Damera-Venkata |
| 7,486,734 | B2 | 2/2009 | Machida |
| 7,505,608 | B2* | 3/2009 | Portigal et al. ............... 382/103 |
| 7,680,337 | B2 | 3/2010 | Gruninger et al. |
| 7,751,645 | B2* | 7/2010 | Reneker et al. ............... 382/275 |
| 7,773,828 | B2 | 8/2010 | Sakata et al. |
| 7,792,321 | B2* | 9/2010 | Palmadesso et al. ......... 382/100 |
| 8,018,647 | B2 | 9/2011 | Rice et al. |
| 8,150,195 | B2 | 4/2012 | Demirci et al. |
| 8,165,344 | B2 | 4/2012 | Shirasaka |
| 8,175,393 | B2 | 5/2012 | Robinson et al. |
| 8,315,472 | B2 | 11/2012 | Robinson et al. |
| 8,391,961 | B2 | 3/2013 | Levenson et al. |
| 2003/0012398 | A1 | 1/2003 | Sunshine et al. |
| 2004/0218172 | A1 | 11/2004 | DeVerse et al. |
| 2006/0188161 | A1 | 8/2006 | Grunninger et al. |
| 2006/0233421 | A1 | 10/2006 | Portigal et al. |
| 2006/0247514 | A1 | 11/2006 | Panasyuk et al. |
| 2007/0076955 | A1 | 4/2007 | Schaum et al. |
| 2009/0074297 | A1 | 3/2009 | Robinson |
| 2010/0158330 | A1 | 6/2010 | Guissin et al. |
| 2010/0303371 | A1 | 12/2010 | Robinson et al. |
| 2011/0002546 | A1* | 1/2011 | Conger et al. ................ 382/191 |
| 2012/0224782 | A1 | 9/2012 | Robinson et al. |
| 2012/0308084 | A1* | 12/2012 | Perrier et al. ................. 382/107 |
| 2012/0314920 | A1 | 12/2012 | Prigent et al. |

OTHER PUBLICATIONS

Kwon et al., "Adaptive anomaly detection using subspace separation for hyperspectral imagery", 2003, Opt. Eng. 42(11), pp. 3342-3351.*
C. Caefer et al., "Analysis of false alarm distributions in the development and evaluation of hyperspectral point target detection algorithms", 2007, Optical Engineering, vol. 46, No. 7, pp. (076402) 1-15.*
Schaum et al., "Spectral Subspace Matched Filtering, Algorithms for Multispectral, hyperspectral, and Ultraspectral Imagery," VII, Proc. Of SPIE, vol. 4381, 2001, pp. 1-17, Incorporated by Schaum Reference.*
Manolakis et al., "Is There a Best Hyperspectral Detection Algorithm?", SPIE—Newsroom; pp. 1-3 (2209).
Boardman, J., et al., Mapping Target Signatures VIA Partial Unmixing of Aviris Data, Citeseer 1995.
Kuybeda, O., et al., Global Unsupervised Anomaly Extraction and Discrimination in Hyperspectral Images via Maximum Orthogonal-Complements Analysis, Feb. 2008, Department of Electrical Engineering Technion IIT Haifa 32000, Israel, Retrieved from Internet<URL: http://webee.technion.ac.il/uploads/file/publication/684.pdf.
Sun, L., et al., "Improved Iterative Error Analysis for Endmember Extraction from Hyperspectral Imagery", SPIE Imaging Spectrometry XIII, vol. 708, pp. 400-407, Intro., Sec 2.2—pp. 3-5 (Aug. 2008).
Veganzones, M.A., et al., "Endmember Extraction Methods: A Short Review", pp. 400-407 (Sep. 2008).
Duran, O., et al., "A Time-Efficient Method for Anomaly Detection in Hyperspectral Images", IEEE Transactions on Geoscience and Remote Sensing, IEEE Service Ctr., NJ, US, vol. 45, No. 12, pp. 3894-3904 (Dec. 2007).
Plaza, A., et al., "Spatial/Spectral Endmember Extraction by Multi-dimensional Morphological Operations", IEEE Transactions on Geoscience and Remote Sensing, IEEE Service Ctr., NJ, US, vol. 40, No. 9, pp. 2025-2029 (Sep. 2002).
Plaza, A., et al., "A New Approach to Mixed Pixel Classification of Hyperspectral imagery based on extended Morphological profiles", Pattern Recognition, Elsevier, vol. 37, No. 6, pp. 1097-1116 (Jun. 2004).

Rogge, D.M., et al., "Integration of Spatial-Spectral Information for the Improved Extraction of Endmembers", Remote Sensing of Environment, Elsevier, vol. 110, No. 3, pp. 287-303 (Aug. 2007).
Filippi, A.M., et al., "Support Vector Machine-Based Endmember Extraction", IEEE Transactions on Geoscience and Remote Sensing, IEEE Service Ctr., NJ, US, vol. 47, No. 3, pp. 771-791 (Mar. 2009).
Keshava, N., et al., "Sprectral Unmixing", IEEE Signal Processing Magazine, vol. 19, No. 1, pp. 44-57, Jan. 1, 2002, XP011093745.
Rogge, D. M., et al., "Iterative Spectral Unmixing for Optimizing Per-Pixel Endmemeber Sets", IEEE Transactions on Geoscience and Remote Sensing, IEE Service Center, vol. 4, No. 12, pp. 3725-3736 (Dec. 2006).
Plaza, Antonio, et al., "A Quantitive and Comparative Analysis of Endmemeber Extraction Algorithms From Hyperspectral Data", IEEE 2004.
Robinson, I., et al. "Comparison of Hyperspectral Sub-Pixel Detection with and Without a Prior Knowledge of Target Features", Aerospace Conference, 1998 IEEE Snowmass at Aspen, Colorado, Mar. 21-28, 1998, vol. 5, pp. 183-189, Mar. 21, 1998, XP010287059, ISBN 978-0-7803-4311-5.
Winter, Michael, "Comparison of Approaches for Determining Endmembers in Hyperspectral Data", IEEE 2000.
Winter, Michael, "N-FINDR: An Algorithm for Fast Autonomous Spectral End-member Determination in Hyperspectral Data", SPIE 1999.
Ulug Bayazit, "Region Adaptive Spectral Transformation for Wavelet Based Color Image Compression", Image Processing (CIP), 2009 16th IEEE International Conference ON, IEEE, Piscataway, NJ, Nov. 7, 2009, pp. 2817-2820, Section 2 and 3.
Dohyun Ahn et al., "Rate-Distortion Optimized Image Compression Using Generalized Principal Component Analysis", Acoustics, Speech and Signal Processing , 2006. ICASSP 2006 Proceedings, 2006 IEEE International Conference on Toulouse, France 14-19, May 14, 2006, pp. 5-8.
Memarsadeghi, N. et al., "A Fast Implementation of the Isodata Clustering Algorithm", IJCGA, vol. 17, No. 1, pp. 71-103 (2007).
Wei, C-P, et al., "Empirical Comparison of Fast Clustering Algorithms for Large Data Sets", Proceedings of the 33rd Hawaii Int'l Conf. On System Sciences, pp. 1-10 (2000).
Yan, D, et al., "Fast Approximate Spectral Clustering", KDD'09, (9 pages) Jun. 28-Jul. 1, 2009, Paris, France.
International Preliminary Report on Patentability dated Aug. 29, 2011 of PCT/US2010/024192 filed Feb. 12, 2010 (21 pages).
Meza et al., "Applied Non-Uniformity Correction Algorithm for Striping Noise Removal in Hyperspectral Images", [Downloaded from the Internet: http://nuc.die.udec.cl/publications/papers/2010-NUCStrippingNoise.pdf on Nov. 20, 2012].
Jiang, Ming-Fei, et al., "A Robust estimation of Virtual Dimensionality in Hyperspectral Imagery," Computational Problem-Solving (ICCP), 2010 International Conference on, vol., no., pp. 374-378, Dec. 3-5, 2010.
Harsanyi, Joseph C., et al., "Hyperspectral Image Classification and Dimensionality Reduction: An Orthogonal Subspace Projection Approach," ZEEE Tmns. On Geoscience and Remote Sensing, 32(4), Jul. 1994.
Neville, R.A., et al., "Automatic Endmember Extraction from Hyperspectral Data for Mineral Exploration", 4th Int. Airborne remote Sensing Conf. Exhibition/21st Canadian Symposium on Remote Sensing, pp. 891-896 1999.
Orthogonality and Least Squares, http://www.aerostudents.com/files/linearAlgebra/orthogonalityLeast Squares.pdf, Jul. 2009.
Marco F. Durarte et al., "Structured Compressed Sensing: From Theory to Applications" IEEE Transactions on Signal Processing, IEEE Service Center, New York, vol. 59, No. 9, Sep. 1, 2011, pages.
Pickering M R et al., "Compression of Hyperspectral Data Using Vector Quantisation and the Discrete Cosine Transform", Image Processing, 2000, Proceedings. 2000 International Conference of Sep. 10-13, 2000, IEEE, Piscataway, NJ, Sep. 10, 2000, pp. 195-198, vol. 2.
International Search Report dated Apr. 27, 2011 of PCT/US2010/024192 filed Feb. 12, 2010 (18 pages).
International Search Report dated Feb. 9, 2009 of PCT/US2008/083738.

(56) References Cited

OTHER PUBLICATIONS

Manolakis et al., "Hyperspectral Image Processing for Automatic Target Detection Applications,", http://www.cis.rit.edu/-cnspci/references/dip/manolakis2003.pdf, 2003.

Leathers et al., "Scene-based Nonuniformity Corrections for Optical and SWIR Pushbroom Sensors", Optics Express; 13(13): 5136-5150 (Jun. 27, 2005).

Foy et al., "Decision boundaries in two dimensions for target detection in hyperspectral imagery," Optics Express; 17(20):17391017411(2009).

Funk et al., "Clustering to improve matched filter detection of weak gas plumes in hyperspectral thermal imagery," IEEE Transactions on Geoscience and Remote Sensing; 39(7):1410-1420 (2001).

Halper, "Global, local and stochastic background modeling for target detection in mixed pixels," The MITRE Corp., Case#10-0838; 13 pages.

Kerekes et al., "Hyperspectral imaging system modeling" Lincoln Laboratory Journal; 14(1):117-130 (2003).

Manolakis: "Standoff detection and identification of chemical plumes with long wave hyperspectral imaging sensors," MIT Lincoln Laboratory: RTO-MP-SET-151; pp. [2-1]-[2-10] 2009.

Messinger et al., "Detection of gaseous effluents from airborne LWIR hyperspectral imagery using physics-based signatures" Institute of Technology, pp. 712-723.

Ientilucci et al., "Target detection in a structured background environment using an infeasibility metric in an invariant space; algorithms and technologies for multispectral, hyperspectral and ultraspectral imagery XI," Proceedings of SPIE, v. 5806, pp. 491-502, 2005.

Jacobsen et al., "Monitoring grasslands using convex geometry and partial unmixing: a case study," 1st EARSeI Workshop on imaging spectroscopy, pp. 309-316; Oct. 1998.

Kruse et al., "Extraction of compositional information for trafficability mapping from hyperspectral data", SPIE International Symposium on AeroSense, v. 4049, pp. 262-273; Apr. 2000.

Mundt et al., "Partial unmixing of hyperspectral imagery: Theory and Methods"; American Society of Photogrammetry and Remote Sensing annual conference, p. 1-12; May 2007.

Nielsen: "Spectral mixture analysis: linear and semiparametric full and iterated partial unmixing in multi and hyperspectral image data", International Journal of Computer Vision: v. 42; No. 1 and 2, pp. 17-37: 2001.

Smith: "Introduction to hyperspectral imaging;" http://microimages.com; p. 1-24, Jul. 14, 2006.

Horn et al., "Destriping Landsat Mss Images by Histogram Modification", Computer Graphics and Image Processing, vol. 10, No. 1, 1 My 1979, pp. 69-83.

Datt et al., "Preprocessing eo-1 Hyperion Hyperspectral Data to Support the Application of Agricultural Indexes", IEEE Transactions on Geoscience and Remote Sensing, IEEE Service Center, Piscataway, NJ, US, vol. 41, No. 6, Jun. 1, 2003, pp. 1246-1259.

Han et al., "Detection and Correction of Abnormal Pixels in Hyperion Images", IEEE International Geoscience and Remote Sensing Symposium, New York, NY, Jun. 24, 2002: vol. 3, Jun. 24, 2002, pp. 1327-1330.

Dyk et al., "Processing Hyperion and Ali for Forest Classification", IEEE Transactions on Geoscience and Remote Sensing, IEEE Service Center, Piscataway, NJ, US, vol. 41, No. 6, Jun. 1, 2003, pp. 1321-1331.

Gadallah et al., "Destriping Miltisensor Imagery with Moment Matching" International Journal of Remote Sensing, Basingstike, Hants, GB, vol. 21, No. 12, Jan. 1, 2000, pp. 2505-2511.

\* cited by examiner

FIG. 2E DETECTION FILTER 2

FIG. 2D DETECTION FILTER 1

SYSTEM AND METHOD FOR POST-DETECTION ARTIFACT REDUCTION AND REMOVAL FROM IMAGES

CROSS REFERENCE TO RELATED APPLICATION

This application is related to U.S. application Ser. No. 13/077,042, filed Mar. 31, 2011, entitled "IMPROVED DETECTION OF TARGETS FROM HYPERSPECTRAL IMAGERY," incorporated by reference in its entirety herein.

BACKGROUND

This disclosure relates generally to the field of image processing and more particularly to a system and a method for post-detection artifact reduction and removal from images.

In conventional image processing scenarios comprising hyperspectral imaging (HSI) systems, artifacts such as sensor calibration artifacts create false alarms for target detection. This problem is present in all spectral sensors and is particularly prevalent in long-wave infrared (LWIR) HSI sensors using Mercury-Cadmium-Telluride (MCT) focal plane arrays (FPAs). Data obtained from such HSI sensors have residual gain and offset errors. Such errors manifest as columns or striping artifacts in detection plane images obtained on the FPAs, and form a limiting factor in optimal detection of targets, especially targets that are dim or dispersed. Accordingly, there is a need to improve target detection and reduce or avoid false alarms.

SUMMARY

In accordance with an embodiment, a method for processing images includes selecting, at an image processor, a region of a first image comprising a plurality of pixels. A mean value of pixels in the selected region is computed. From a plurality of sets of pixels in the region, a first subset of pixels in the region containing artifacts therein is selected. A value of each pixel in the first subset is compared with the mean value. The value of each pixel is adjusted based upon the comparing. The first image is reconstructed based upon the adjusted value of each pixel in the first subset, such that a variance of pixel values in the reconstructed image is lower than a variance of pixel values in the first image.

In accordance with an embodiment, an image processing system includes a memory having computer executable instructions thereupon. The image processing system includes an image processor coupled to the memory, the computer executable instructions when executed by the image processor cause the image processor to select a region of a first image comprising a plurality of pixels, compute a mean value of pixels in the selected region, select, from a plurality of sets of pixels in the region, a first subset of pixels in the region containing artifacts therein; compare a value of each pixel in the first subset with the mean value, adjust the value of each pixel based upon the comparing, and reconstruct the first image based upon the adjusted value of each pixel in the first subset, such that a variance of pixel values in the reconstructed image is lower than a variance of pixel values in the first image.

In accordance with an embodiment, a tangible computer-readable storage medium includes one or more computer-readable instructions thereon for processing images, which when executed by one or more processors cause the one or more processors to select a region of a first image comprising a plurality of pixels, compute a mean value of pixels in the selected region, select, from a plurality of sets of pixels in the region, a first subset of pixels in the region containing artifacts therein; compare a value of each pixel in the first subset with the mean value, adjust the value of each pixel based upon the comparing, and reconstruct the first image based upon the adjusted value of each pixel in the first subset, such that a variance of pixel values in the reconstructed image is lower than a variance of pixel values in the first image.

In accordance with an embodiment, a method for reducing an effect of sensor artifacts appearing in an image of a scene captured by a sensor includes determining, at an image processor, a mean value of a plurality of pixels in the image captured by the sensor. Sensor artifacts that appear as a plurality of striped columns in the image are identified. A value of each pixel in a striped column is compared with the mean value of the plurality of pixels in the image. The value of each pixel in the striped column is adjusted based upon the comparing. The image is reconstructed based upon the adjusted pixel value of each pixel, such that the reconstructed image shows a reduced effect of the sensor artifacts as compared to the image captured by the sensor.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

DETAILED DESCRIPTION

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Hyperspectral sensors providing hyperspectral imaging can be beneficially applied in a wide array of practical applications. Examples of such uses include aid in the detection of chemical or biological weapons, bomb damage assessment of underground structures, drug production and cultivation, as well as the detection of friend-or-foe troops and vehicles beneath foliage or camouflage.

Some targets are relatively easy to detect using standard techniques; whereas, other may not be. For example, detection of a terrain, such as asphalt, or concrete may be relatively straightforward for some images in which pixels (ground resolution cells) are filled by substantially the same material (e.g., asphalt or concrete). Alternatively, the measured signatures of a dispersed target, such as a gaseous plume, are complicated by a combination of phenomenology including effects of the atmosphere, spectral characteristics of the background material under the plume, temperature contrast between the gas and the surface, and the concentration of the gas. All of these quantities vary spatially further complicating the detection problem. For example, an effluent target in a low wind and having a relatively dense and very bright target signature on at least a few contiguous pixels may be relatively easy to detect, even with a substantially high threshold. Accordingly, such relatively easy to detect targets would require minimal or no spatial processing. Alternatively, targets in a high wind and/or sparse, or weak may be present in dozens to hundreds pixels of a given image. Unfortunately, all or most such pixels may be below conventional thresholds.

A description of embodiments of systems and processes for reducing or removing artifacts and in at least some instances reducing or removing sensor artifacts through analysis and post-detection processing of a hyperspectral detection image follows, although the techniques and systems in this disclosure may be applied to stationary or mobile, as well as solid or liquid targets. Beneficially, the techniques described herein include computationally non-complex algorithms that reduce false alarms due to clutter and artifacts.

Figure 1:
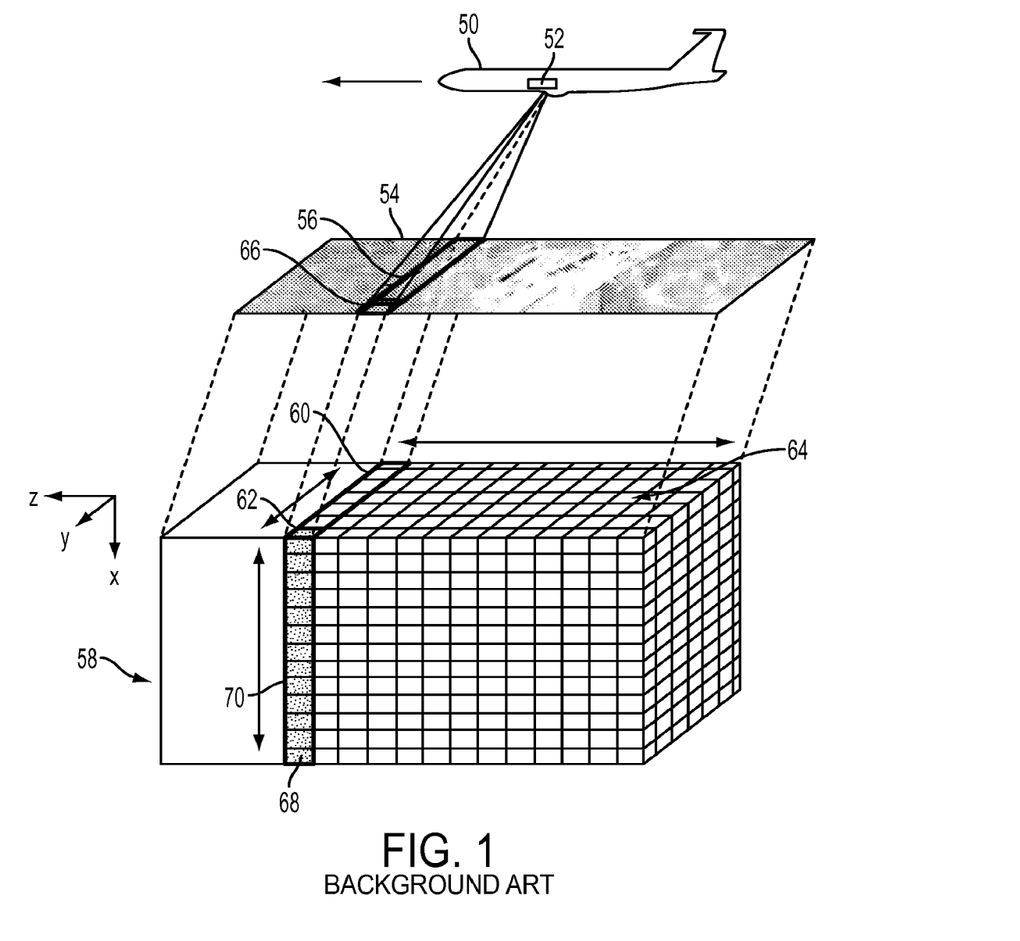
FIG. 1 illustrates a simplified diagram of a conventional hyperspectral imaging (HSI) system that generates a three-dimensional (3D) hyperspectral image data cube.

FIG. 1 illustrates a simplified diagram of a prior art hyperspectral imaging system adapted for capturing and generating hyperspectral image (HSI) data. Mobile platform 50 containing HSI imaging system 52 is positioned above terrain 56 to be imaged. Mobile platform 50 can be any suitable platform, such as a fixed wing aircraft, a helicopter, a lighter-than-air vehicle, and/or a satellite. HSI imaging system 52 is arranged on platform 50 to view a particular region 56 of terrain 54. In the example embodiment, viewed region 56 is substantially rectangular with an elongated dimension arranged transverse to a direction of motion of platform 50 (e.g., parallel to y-axis), although in alternative embodiments, viewed region 56 may be of any arbitrary shape.

HSI imaging system 52 captures radiation reflected, refracted, radiated, scattered or otherwise modified and returned by imaged terrain 54. In one embodiment, the radiation results from solar radiation returned from terrain 54. As illustrated, platform 50 can be mobile. Alternatively, platform 50 may be stationary. As such, HSI imaging system 52 is configured to obtain periodic updates to imaged terrain 54, such that an extended surface of region 54 of terrain 56 can be imaged, also referred to as scene 64.

A graphical representation of example HSI data, sometimes referred to as HSI data cube 58, is illustrated below terrain 54. Top surface 64 of cube 58, defined in the y-z plane represents a two-dimensional array of imaged cells, or pixels. Rectangular arrangement of image pixels 60 forming a row parallel to the y-axis represents one sample of imaged terrain 54. In one embodiment, the imaged row itself includes several pixels 62 extending along the row of pixels 60. Single pixel 62 corresponds to a minimum resolution cell of imaged terrain 54. The minimum resolution is sometimes referred to as ground sample distance (GSD)—a center-to-center spacing of adjacent pixels. Each pixel 62, in turn, is imaged by HSI imaging system 52 to produce a spectrum associated with radiation returned from imaged cell 66. The spectrum can be partitioned, for example, into several frequency bins 68 and stored in array 70 associated with each pixel 62. In the example HSI data cube 58, spectral array 70 is oriented parallel to the x-axis, although other orientations may be possible.

Figure 2A:
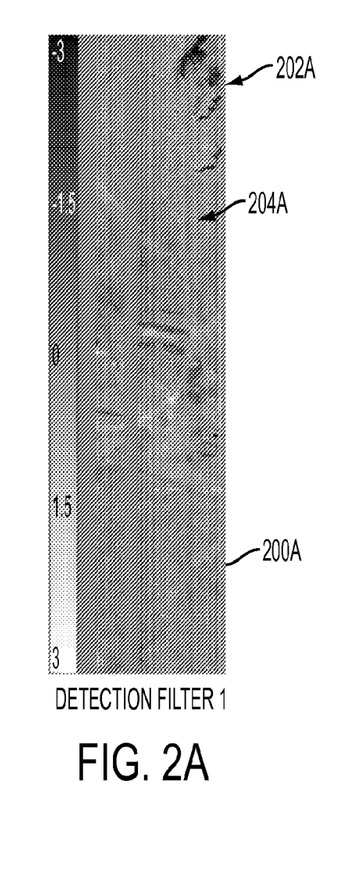
FIGS. 2A-2E illustrate example detection images having sensor artifacts in different scenarios and targets, in accordance with an embodiment.

FIGS. 2A-2E illustrate example detection images having sensor artifacts in different scenarios and targets using an LWIR detector system in HSI imaging system 52, in accordance with an embodiment. By way of example only, FIG. 2A illustrates detection plane or detection image 200A corresponding to a scene of imaged terrain 54 obtained after converting HSI data cube 58 to a detection plane in the y-z coordinate plane shown in FIG. 1, although the choice of coordinate planes is illustrative only and is not a restriction. For example, detection image 200A is produced by processing original 3-D HSI data cube 58 with a spectral matched filter for a specific target type. Detection image 200A indicates the suspected presence of that target type by having either a very bright (white) pixel or a very dark (black pixel). Gray pixels indicate a lower filter score and lower suspected abundance of the target type. In one embodiment, one or more thresholds are applied to detection image 200A to determine which pixels have the target. An example problem associated with the striped images such as detection image 200A is that the stripes cause some of the pixels to exceed the threshold even though they contain no target. Obtaining and processing detection image 200A from HSI data cube 58 is described in FIGS. 3A and 3B below where the problem of such false alarms when there is no target is resolved. In one embodiment, detection image 200A comprises first type of target 202A, which is suspected to be dispersed, as determined by an image processor (not shown) in HSI imaging system 52 aboard moving platform 50. By way of example only, image processor includes one or more processors, memory, among other hardware components, and buses for communication therebetween. Further, memory may include computer executable instructions stored therein (e.g., on tangible non-transitory computer readable media or memory) to carry out various features and functionalities in accordance with various embodiments described in this disclosure. In FIG. 2A, target 202A is substantially clear relative to a background of image 200A. However, capturing images of terrain 54 to produce detection image 200A by HSI imaging system 52 introduces various artifacts (e.g., sensor artifacts), at least some of which artifacts manifest as stripes 204A in detection image 200A. Depending upon relative brightness or reflectivity levels of targets such as target 202A with respect to stripes 204A, detection of target 202A by an image processor in HSI imaging system 52 may be affected, for example, when stripes 204A are brighter than target 202A.

Figure 2B:
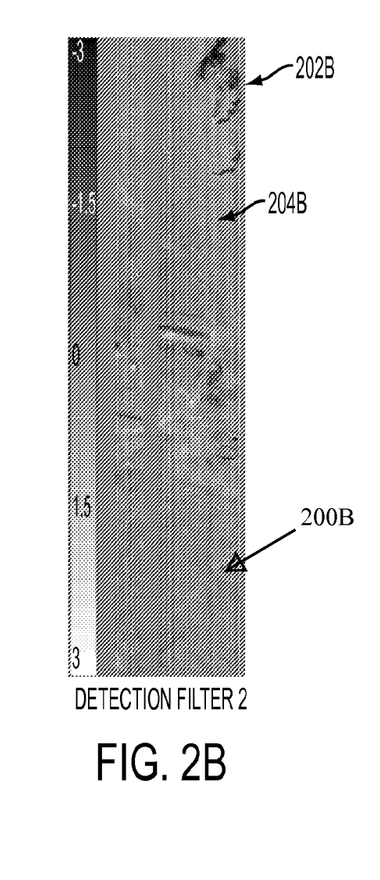

By way of example only, FIG. 2B illustrates another detection image 200B, which may be an image corresponding to terrain 54, obtained by processing HSI data cube 58 in the y-z coordinate plane shown in FIG. 1. Detection image 200B comprises a second type of target 202B, which is suspected to be dispersed by an image processor (not shown) in HSI imaging system 52 aboard moving platform 50. Similar to FIG. 2A, in FIG. 2B, target 202B is substantially clear relative to a background of image 200B. However, capturing detection image 200B by HSI imaging system 52 introduces various artifacts (e.g., sensor artifacts), at least some of which manifest as stripes 204B in detection image 200B. Depending upon relative brightness or reflectivity levels of targets such as target 202B with respect to stripes 204B, detection of target 202B by an image processor in HSI imaging system 52 is affected, for example, when stripes 204B are brighter than target 202B.

Figure 2C:
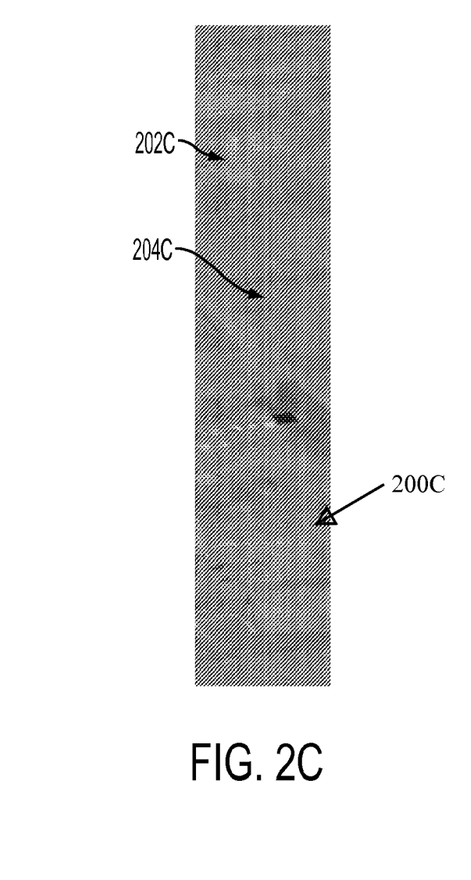

By way of example only, FIG. 2C illustrates another detection image 200C, which may be an image corresponding to terrain 54, obtained by processing HSI data cube 58 in the y-z coordinate plane shown in FIG. 1. Detection image 200C comprises a third type of target 202C, which is suspected to be dispersed by an image processor (not shown) in HSI imaging system 52 aboard moving platform 50. Unlike FIGS. 2A and 2B, in FIG. 2C, target 202C is dim relative to a background of image 200C. However, capturing detection image 200A by HSI imaging system 52 introduces various artifacts (e.g., sensor artifacts), at least some of which manifest as stripes 204C in detection image 200C. As illustrated, target 202C is relatively harder to detect and depending upon relative brightness or reflectivity levels of targets such as target 202C with respect to stripes 204C, detection of target 202C by an image processor in HSI imaging system 52 is affected, for example, when stripes 204C are brighter than target 202C.

Figure 2D:
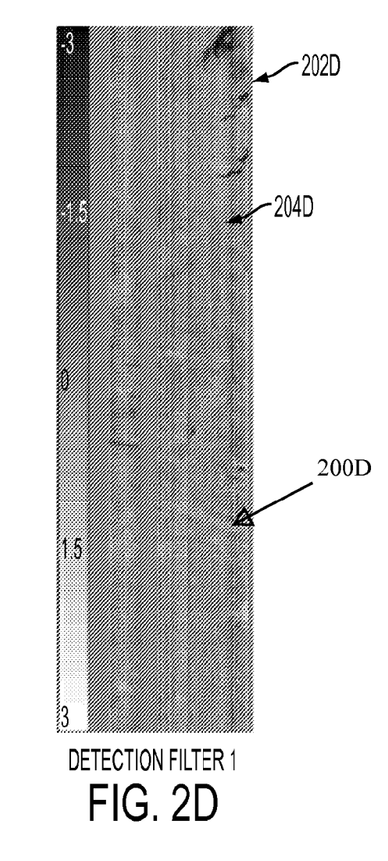

By way of example only, FIG. 2D illustrates another detection image 200D, which may be an image corresponding to terrain 54, obtained by processing HSI data cube 58 in the y-z coordinate plane shown in FIG. 1. Detection image 200D comprises a fourth type of target 202D, which is suspected to be dispersed by an image processor (not shown) in HSI imaging system 52 aboard moving platform 50. Like FIGS. 2A and 2B, in FIG. 2C, target 202D is bright relative to a background of image 200D, but is obfuscated by clutter and stripes 204D, which are introduced as manifestations of artifacts (e.g., sensor artifacts) when detection image 200D is captured by HSI imaging system 52. As illustrated, target 202D is relatively harder to detect and depending upon relative brightness or reflectivity levels of targets such as target 202D with respect to stripes 204D, detection of target 202D by an image processor in HSI imaging system 52 is affected, for example, when stripes 204D are brighter than target 202D.

Figure 2E:
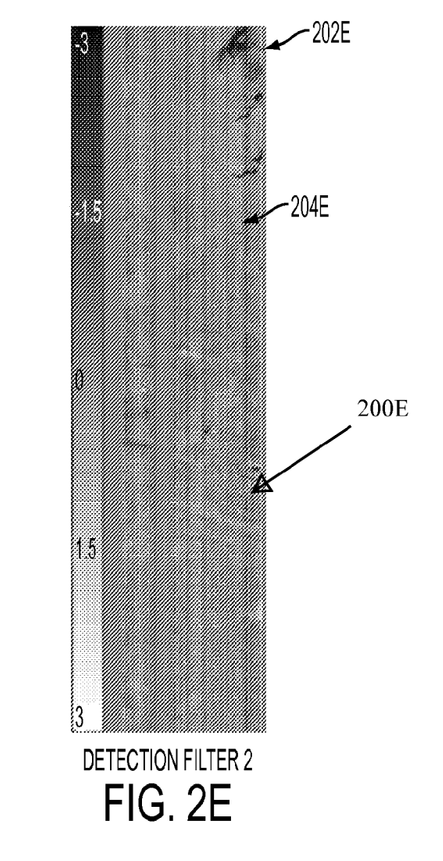

By way of example only, FIG. 2E illustrates another detection image 200E, which may be an image corresponding to terrain 54, obtained by processing HSI data cube 58 in the y-z coordinate plane shown in FIG. 1. Detection image 200E comprises target 202E, which is suspected to be dispersed by an image processor (not shown) in HSI imaging system 52 aboard moving platform 50. Like FIGS. 2A and 2B, in FIG. 2C, target 202D is bright relative to a background of image 200E, but is obfuscated by clutter and stripes 204E, which are introduced as manifestations of artifacts (e.g., sensor artifacts) when detection image 200E is captured by HSI imaging system 52. As illustrated, target 202E is relatively harder to detect and depending upon relative brightness or reflectivity levels of targets such as target 202E with respect to stripes 204E, detection of target 202E by an image processor in HSI imaging system 52 is affected, for example, when stripes 204E are brighter than target 202E.

Accordingly, FIGS. 2A-2E illustrate various scenarios with different types of targets that are detected when artifacts (e.g., sensor artifacts) are introduced. It is to be noted that other similar scenarios with varying levels of intensities of potential targets may be captured in detection images obtained by processing HSI data cube 58 by an image processor in HSI imaging system 52, as may be contemplated by one of ordinary skill in the art, in view of this disclosure. For example, targets may not be dispersed gases but may be solids (e.g., enemy tanks in a battlefield) or liquids (e.g., spills), and/or may be stationary or mobile.

Figure 3A:
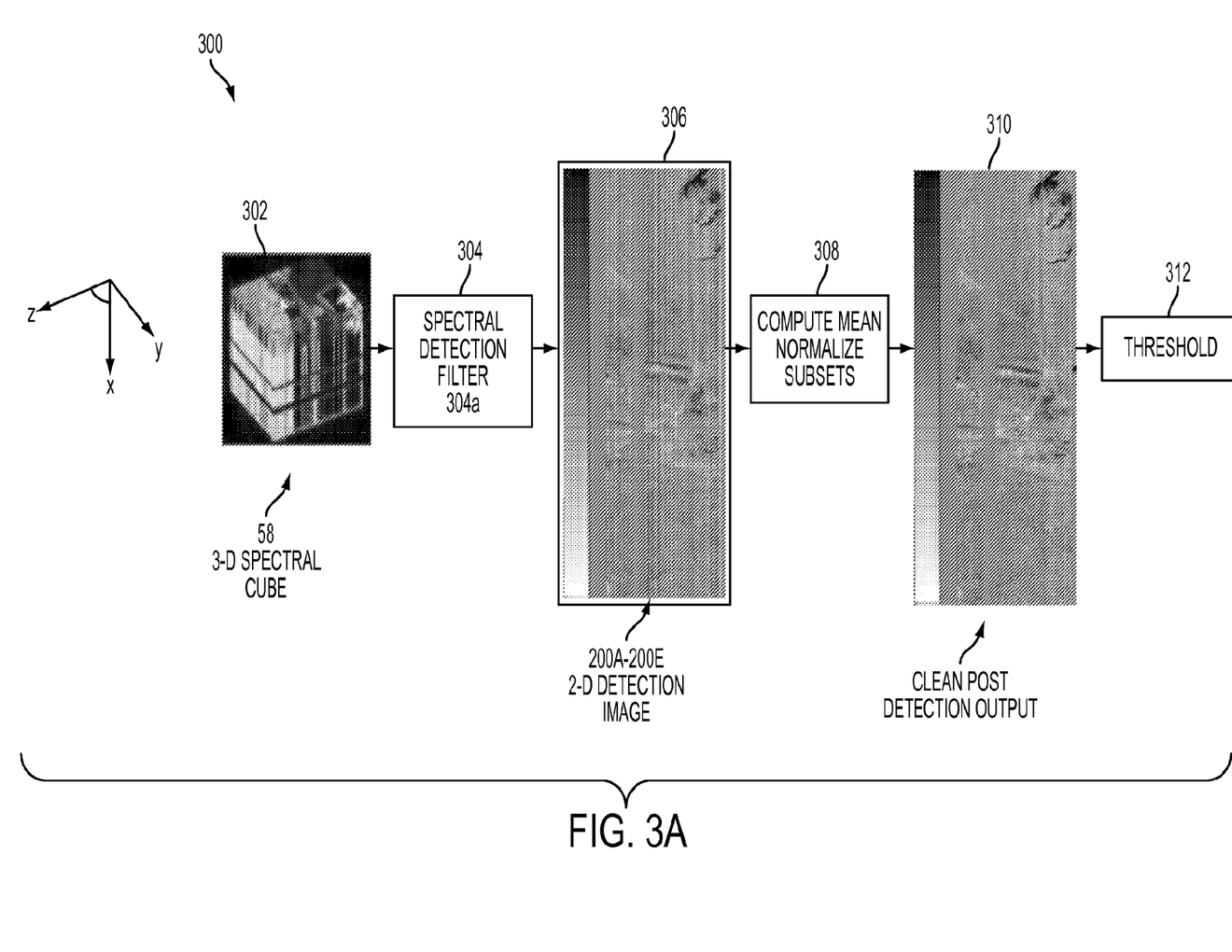
FIGS. 3A and 3B illustrate flow diagrams for reducing and/or removing effects of sensor artifacts from detection images, in accordance with an embodiment.

FIG. 3A illustrates a flow diagram 300 for a method for reducing and/or removing artifacts (e.g., sensor artifacts) from detection images, in accordance with an embodiment.

In an operation 302, hyper-spectral data cube 58 is obtained from various images captured at different frequencies (or, "colors") by HSI imaging system 52 of mobile platform 50, as discussed with respect to FIG. 1 above.

In an operation 304, hyper-spectral data cube 58 is provided to spectral detection filter 304a in HSI imaging system 52. Spectral detection filter 304a creates a scalar two-dimensional (2D) detection image (e.g., detection images 200A-200E). Spectral detection filter 304a may comprise a plurality of individual filters connected in series, parallel, or both. By way of example only, spectral detection filter 304a may include spectral matched filter, signed adaptive cosine estimation filter, or other types of filters known to those of ordinary skill in the art, such as those disclosed by Manolakis, et al. in the paper "Is There a Best Hyperspectral Detection Algorithm?," Algorithms and Technologies for Multispectral, Hyperspectral, and Ultraspectral Imagery XV, edited by Shen, et al., Proc. of SPIE Vol. 7334, 733402 (2009), incorporated by reference in its entirety herein.

In operation 306, spectral detection filter 304a provides one or more of detection images 200A-200E to an image processor in HSI imaging system 52 of imaging platform 50, although other number of images may be extracted from HSI data cube 58. As noted above, detection images 200A-200E include various artifacts such as sensor artifacts that manifest themselves as stripes 204A-204E making target detection difficult or impossible, and causing an increase in the rate of false alarms. Upon generation of the detection image in operation 306, the flow proceeds to operation 308, which is described as a separate flowchart in FIG. 3B.

Figure 3B:
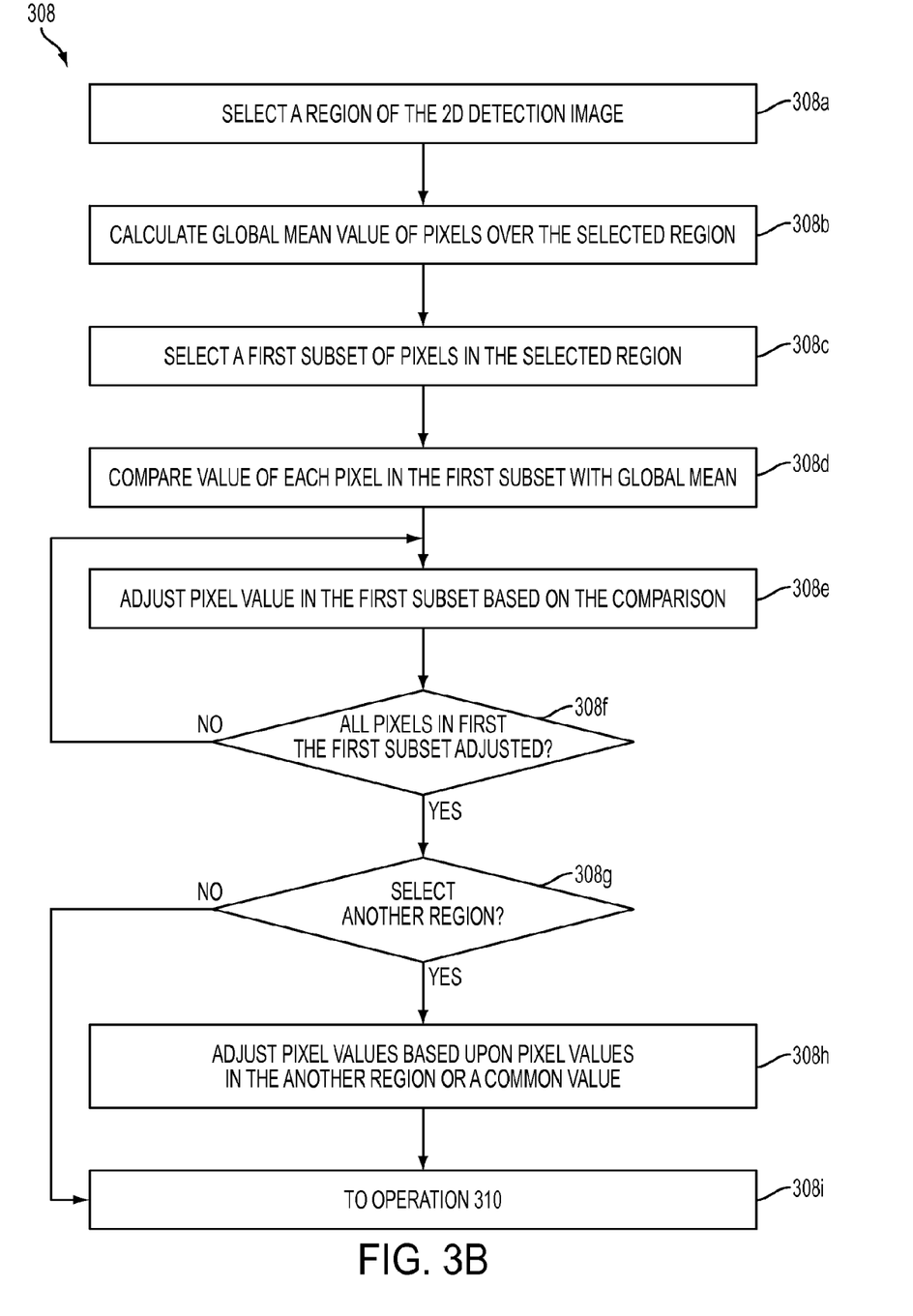

FIG. 3B illustrates operation 308 in more detail. In operation 308a, the image processor in HSI imaging system 52 selects a region of the detection image received at an output of spectral detection filter 304a. In one embodiment, the selected region may be the entire detection image. Regardless of a size of the selected region of the detection image, the selected region includes one or more stripes (e.g., stripes 204A-204E) that are manifestation of various artifacts introduced by sensors in HSI imaging system 52. For example, at least one such artifact is a sensor artifact. In one embodiment, such stripes include a column of pixels such that an artifact is correlated along the column, e.g., due to the platform motion or scan motion of the sensor on imaging platform 50 is such that a set of specific sensor pixels make measurements along a given column. Any error in the calibration of these specific pixels will show up along the entire column which may appear as a striped column in detection image.

In operation 308b, a global mean value of the selected region of the detection image is computed. Computing the global mean comprises computing pixel values across the detection image and dividing by the number of pixels, although other types of global means may also be computed by an image processor in HSI imaging system 52. For example, global mean value of pixels in the detection image may be computed using arithmetic, geometric, harmonic, or other types of generalized means known to those of ordinary skill in the art.

In operation 308c, after the global mean has been computed, a first subset of pixels in the selected region of the detection image is selected. The first subset of pixels may comprise at least one column, and typically a plurality of columns that include artifacts therein (e.g., those introduced by sensors in HSI imaging system 52). For example, a column of such pixels in the first subset of pixels may include thousand (1000) pixels, although other numbers of pixels are possible. In one embodiment, the detection image may include an integer number of such columns (e.g., 256 columns) appearing as stripes (e.g., stripes 204A-204E), which may cause target detection to be difficult or impossible, although other number of columns could be present depending on the type of artifact that is manifested onto the detection image. Alternatively or additionally, such stripes in the selected region or the selected subset of pixels may cause a false detection or false alarm when no target is present.

In operation 308d, a value of each pixel in the first subset including the column is compared with the global mean computed in operation 308b. For example, some pixels in the column may have a value higher than the global mean, whereas some may have a value lower than the global mean. Additionally or optionally, at least one pixel in the column may have a value equal to the global mean. It is to be noted that the term "global" is relative to a region and may be used in context of an entire image, or may be used in context of a selected region of pixels that is being operated upon.

In operation 308e, the value of each pixel is adjusted based upon the comparison in operation 308d. By way of example only, in one embodiment, each pixel value is adjusted such that the adjusted value is nearer to the global mean value computed in operation 308c. Therefore, pixel values that are lower than global mean value are increased, and likewise, pixel values higher than the global values are decreased. This process is referred to as "normalization." In one embodiment, based upon the comparing with the global mean, all pixel values in the column are adjusted to or set to zero, and therefore, the comparison of operation 308d may be optional in this case. In one embodiment, adjusting may comprise adjusting the mean value of pixels in each subset in the region to be equal to a mean value of pixels in the entire region. In one embodiment, adjusting may comprise further adjusting the pixels in each subset of the region to have a common variance ($\sigma$). Further, adjusting may be carried out on the column of pixels, such that at least artifact is correlated along the column. In an alternative embodiment, adjusting may carried out based upon the mean (or, global mean) being equal to a value selected in a range of zero to a real number value (e.g., 0 to 5).

In operation 308f, image processor in HSI imaging system 52 determines if all columns (corresponding to subsets of pixels) in the selected region have been compared. If not, operation 308e may be repeated for additional columns in the selected region. If yes, the flow proceeds to operation 308g.

In operation 308g, image processor in HSI imaging system 52 determines whether or not to select another region of the detection image that has sensor artifacts. Like the earlier selected region in operation 308a, the another region may be anywhere in the detection image, including being inside, partially inside, or outside the earlier selected region of operation 308a.

In one embodiment, this another region of the detection image may be selected based upon a presence of sensor artifacts manifested as stripes (one or more columns of whitish appearing pixels). In one embodiment, the entire detection image may be selected. If the another region is selected, the flow proceeds to operation 308h. If not the flow proceeds to operation 308i.

In operation 308h, the pixel values of all the regions may be set to a common value. For example, the pixel values of the earlier selected region are adjusted to be equal to a mean value of pixels in the another region. Alternatively, the value of pixels in the another region may be adjusted according to the values of the pixels in the earlier selected region. In one embodiment, such adjustment may comprise adjusting the mean value of the pixels in both regions to be equal to zero. In one embodiment, a variance of pixels in the another region is adjusted by image processor in HSI imaging system 52 to be equal to a variance of pixels in the region based upon the adjusted zero mean valued pixels of the first subset. Similarly, after setting all the mean values to zero, the variance of each region may be modified such that the values of the pixels in each region are multiplied by a quantity to result in each region having a common variance. The flow then proceeds to operation 308i where the image processor carries out operation 310 of FIG. 3A.

Referring back to FIG. 3A, in operation 310, upon adjusting various pixel values in different columns of the selected regions, based upon the global mean, the 2D detection image is reconstructed as a clean post-detection image outputted by image processor in HSI imaging system 52. As illustrated in FIG. 3A, the clean image in operation 310 shows a lesser or reduced effect of stripes due to sensor artifacts or other artifacts as compared to the 2-D detection image outputted by spectral detection filter 304a.

In operation 312, the clean post detection image is used by image processor in HSI imaging system 52 to apply threshold detection techniques for presence of one or more targets (e.g., target 202C). Since thresholding techniques determining which pixels are above or below threshold are known to those of ordinary skill in the art, they will not be described in detail herein.

It is to be noted that various steps or operations of the flowcharts discussed in the disclosure may be carried out using computing devices having processors, memory, buses, and ports that are part of HSI imaging system 52 to aid carrying out such steps or operations. Alternatively, or additionally, such steps may be carried out by executing instructions residing upon non-transitory or tangible computer readable media using one or more processor devices. Further, steps of the flowcharts may be merged, skipped, or new steps added for specific applications in which various embodiments may be implemented, as may be contemplated by those of ordinary skill in the art after reading this disclosure.

Figure 4:
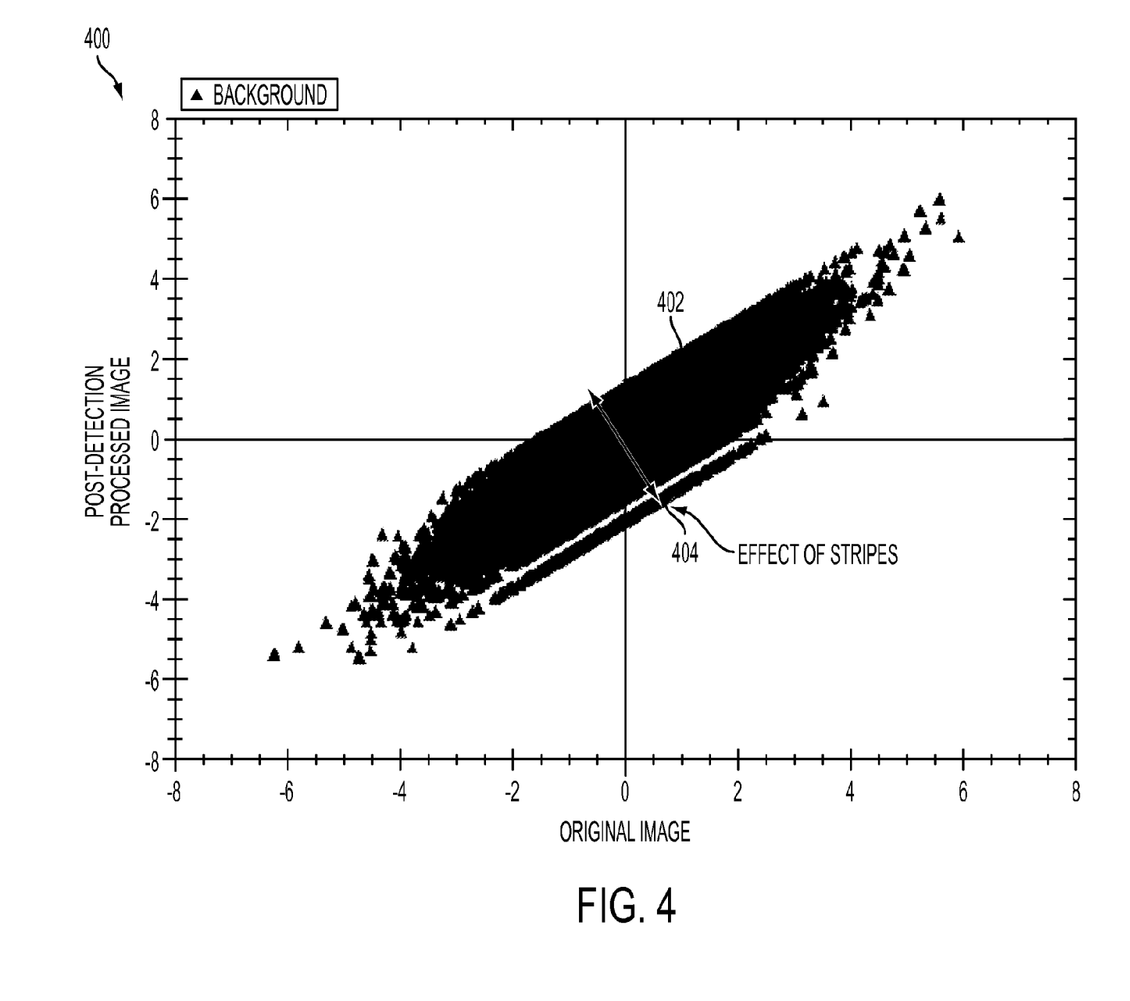
FIG. 4 illustrates a scatter plot comparing pixels in an original image with pixels in a reconstructed image processed in accordance with an embodiment.

FIG. 4 illustrates scatter plot 400 comparing pixels in an original image with pixels in a reconstructed image processed in accordance with an embodiment. By way of example only, scatter plot 400 is representative of an example dispersed target environment, although similar scatter plots for other target environments (e.g., acetone) may be used. As a result of the normalization process, where column means are adjusted (e.g., in operation 308h), variance ($\sigma$) in pixel values is reduced from three times ($3\sigma$) in the original 2D detection image to a factor of about unity ($1\sigma$) in the clean post detection image reconstructed from operation 308 in operation 310. Scatter plot 400 shows region 402 and region 404. Region 404 illustrates the effect of stripes (e.g., stripes 204A) on scatter plot 400. Scatter plot 400 may be used as a diagnostic tool by imaging system 52. Scatter plot 400 illustrates that there is not a 1:1 correspondence between a detection image before operation 308 is applied and after operation 308 is applied to detection images 200A-200E. There is a spread of pixel values that correspond to the striping artifacts. The value shown by region 404 is indicative of the additional variance in the original image (prior to operation 308) as compared to processed detection image (after applying operation 308). Operation 308 removes this variance and thus makes it more likely that a pixel exceeds threshold only if it contains target, rather than due to variance that is due to sensor artifacts or other causes prior to applying operation 308.

Figure 5:
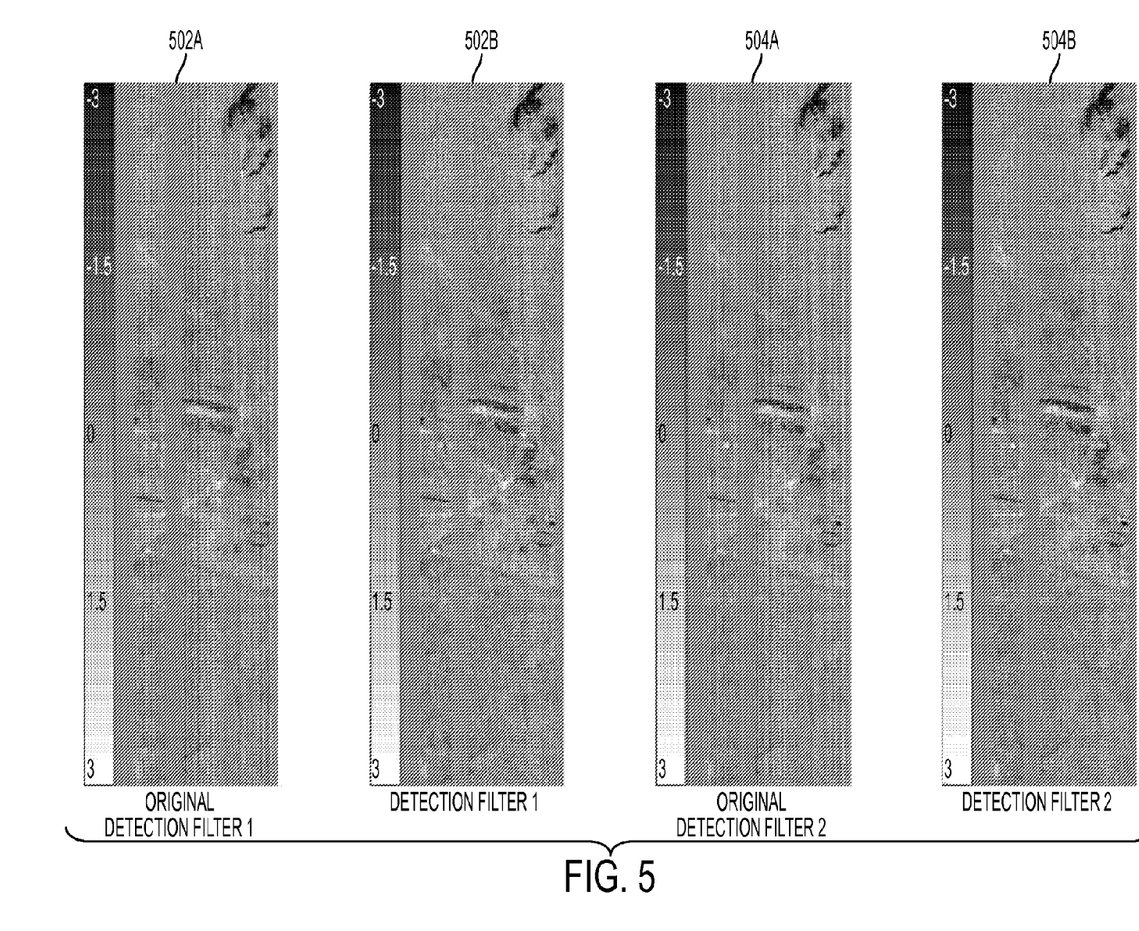
FIG. 5 illustrates example images resulting from processing of detection images, in accordance with an embodiment.

FIG. 5 illustrates example images resulting from processing of detection images, in accordance with an embodiment. 2D detection image 502A is an original image output by a first filter in spectral detection filter 304a and shows a larger effect of stripes than post detection image 502B for a first type of gaseous target, although other types of targets may be present and detected. Likewise, 2D detection image 504A is an original image output by a second filter in spectral detection filter 304a and shows a larger effect of stripes than post detection image 504B for another type of gaseous target, although other types of targets may be present and detected. As illustrated in FIG. 5, post detection images 502B and 504B are more amenable to accurate target detection and lower number of false alarms resulting from a reduced effect of stripes, since variance in post detection images 502B and 504B is less than 5σ, compared to 7.5σ in 2D detection images 502A and 504A. It is to be noted that the numerical values are for example purposes only, and other numerical values for variance may be possible.

The above-described systems and methods can be implemented in digital electronic circuitry, in computer hardware, firmware, and/or software, e.g., in HSI imaging system 52. The implementation can be as a computer program product (i.e., a computer program tangibly embodied in an information carrier medium). The implementation can, for example, be in a machine-readable storage device for execution by, or to control the operation of, data processing apparatus. The implementation can, for example, be a programmable processor, a computer, and/or multiple computers.

In one embodiment, a computer program can be written in any form of programming language, including compiled and/or interpreted languages, and the computer program can be deployed in any form, including as a stand-alone program or as a subroutine, element, and/or other unit suitable for use in a computing environment to carry out the features and functions of various embodiments discussed herein. A computer program can be deployed to be executed on one computer or on multiple computers at one site (e.g., in HSI imaging platform 50).

Method steps or operations can be performed as processes by one or more programmable processors executing a computer program to perform functions of various embodiments by operating on input data and generating output. Method steps can also be performed by and an apparatus can be implemented as special purpose logic circuitry. The circuitry can, for example, be a field programmable gate array (FPGA) and/or an application specific integrated circuit (ASIC). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., magnetic, magneto-optical disks, or optical disks).

Data transmission including transmission of detection images 200A-200E and clean post-detection images 502B and/or 504B and instructions may occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described systems and techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system may be coupled to and/or include clients and servers. A client and a server are generally remote from each other and typically interact through a communication network. The relationship of client and server arises by virtue of computer programs running on the respective computing devices and having a client-server relationship to each other.

Communication networks may include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device in HSI imaging system 52 may include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® INTERNET EXPLORER® available from Microsoft Corporation, of Redmond, Wash.). The mobile computing device includes, for example, a BLACKBERRY® provided by Research In Motion Limited of Waterloo, Ontario, Canada.

"Comprise," "include," and/or plural forms of each are open ended and include the listed parts and can include additional parts that are not listed. "And/or" is open ended and includes one or more of the listed parts and combinations of the listed parts.

Although the above disclosure discusses what is currently considered to be a variety of useful embodiments, it is to be understood that such detail is solely for that purpose, and that the appended claims are not limited to the disclosed embodiments, but, on the contrary, are intended to cover modifications and equivalent arrangements that are within the spirit and scope of the appended claims.

What is claimed is:

1. A method for image processing, comprising:
   at an image processor provided with a single two-dimensional detection image comprising a plurality of pixels, each of the pixels being associated with a scalar value representing a relative likelihood that a target is located in a subject pixel, the two-dimensional detection image and associated scalar values being the output of a detection filter for the target applied to a three-dimensional hyperspectral data cube representing a hyperspectral scene collected at a single time:
   selecting a region of the two-dimensional detection image;
   for each subset in a plurality of sets of pixels in the selected region, computing a mean of the scalar values of the pixels in the subset;
   selecting from the plurality of sets of pixels in the selected region, a first subset of pixels in the selected region containing artifacts therein;
   comparing the mean of scalar values of the pixels in the first subset with the mean of the scalar values of the pixels in a second subset;
   adjusting the scalar value of each pixel in the first subset based upon the comparing; and
   reconstructing the provided two-dimensional detection image into a reconstructed two-dimensional image based upon the adjusted scalar value of each pixel in the first subset, such that a variance of scalar values of the pixels in the reconstructed two-dimensional image is lower than a variance of scalar values of the pixels in the two-dimensional detection image.

2. The method of claim 1, wherein the adjusting comprises adjusting the mean of the scalar values of the pixels in each subset in the region to be equal to a mean of the scalar values of the pixels in the entire region.

3. The method of claim 2, wherein the adjusting comprises adjusting the mean of the scalar values of the pixels in the entire region to be equal to zero.

4. The method of claim 3 further comprising: further adjusting the scalar values of the pixels in each subset of the region to have a common variance.

5. The method of claim 1, wherein the each subset of pixels comprises a column of pixels in the selected region, and wherein the comparing is carried out for each column of pixels.

6. The method of claim 5, wherein the adjusting is carried out on the column of pixels, and wherein at least one artifact is correlated along the column.

7. The method of claim 1 further comprising: applying, using the image processor, a threshold detection rule for detecting a presence of a target in the reconstructed image.

8. The method of claim 1, wherein the adjusting is carried out based upon the mean of the scalar values of the pixels in the selected region being equal to a value selected in a range of zero to a real number value.

9. The method of claim 1 further comprising: filtering the two-dimensional detection image prior to selecting the region.

10. The method of claim 1, wherein the artifacts comprise at least one sensor artifact.

11. An image processing system comprising:
    a memory having computer executable instructions thereupon; and
    an image processor coupled to the memory, the computer executable instructions when executed by the image processor cause the image processor, provided with a single two-dimensional detection image comprising a plurality of pixels, each of the pixels being associated with a scalar value representing a relative likelihood that a target is located in a subject pixel, the two-dimensional detection image and associated scalar values being the output of a detection filter for the target applied to a three-dimensional hyperspectral data cube representing a hyperspectral scene collected at a single time, to:
    select a region of the two-dimensional detection image;
    for each subset in a plurality of sets of pixels in the selected region, compute a mean of the scalar values of the pixels in the subset;
    select, from the plurality of sets of pixels in the selected region, a first subset of pixels in the selected region containing artifacts therein;
    compare the scalar value of each the pixels in the first subset with the mean of the scalar values of the pixels in a second subset;
    adjust the scalar value of each pixel in the first subset based upon the comparing; and
    reconstruct the provided two-dimensional detection image into a reconstructed two-dimensional image based upon the adjusted scalar value of each pixel in the first subset, such that a variance of scalar values of the pixels in the reconstructed two-dimensional image is lower than a variance of scalar values of the pixels in the two-dimensional detection image.

12. The image processing system of claim 11, wherein the computer executable instructions when executed by the image processor further cause the image processor to adjust mean of the scalar values of the pixels in each subset in the region to be equal to a mean of the scalar values of the pixels in the entire region.

13. The image processing system of claim 12, wherein the mean of the scalar values of the pixels in the entire region is adjusted by the image processor to be equal to zero.

14. The image processing system of claim 13, wherein the computer executable instructions when executed by the image processor further cause the image processor to further adjust the scalar values of the pixels in each subset of the region to have a common variance.

15. The image processing system of claim 11, wherein the each subset of pixels comprises a column of pixels in the selected region, and wherein the comparing is carried out for each column of pixels.

16. The image processing system of claim 15, wherein the computer executable instructions when executed by the image processor further cause the image processor to adjust on the column of pixels, and wherein at least one artifact is correlated along the column.

17. The image processing system of claim 11, wherein the artifacts comprise at least one sensor artifact.

18. A tangible non-transitory computer-readable storage medium having computer-readable instructions stored therein for processing images, which when executed by one or more processors cause the one or more processors, provided with a single two-dimensional detection image comprising a plurality of pixels, each of the pixels being associated with a scalar value representing a relative likelihood that a target is located in a subject pixel, the two-dimensional detection image and associated scalar values being the output of a detection filter for the target applied to a three-dimensional hyperspectral data cube representing a hyperspectral scene collected at a single time, to:

select a region of the two-dimensional detection image;

for each subset in a plurality of sets of pixels in the selected region, compute a mean of the scalar values of the pixels in the subset;

select, from the plurality of sets of pixels in the selected region, a first subset of pixels in the selected region containing artifacts therein;

compare the mean of scalar values of the pixels in the first subset with the mean of the scalar values of the pixels in a second subset;

adjust the scalar value of each pixel in the first subset based upon the comparing; and     reconstruct the provided two-dimensional detection image into a reconstructed two-dimensional image based upon the adjusted scalar value of each pixel in the first subset, such that a variance of scalar values of the pixels in the reconstructed two-dimensional image is lower than a variance of scalar values of the pixels in the two-dimensional detection image.

19. A method for reducing an effect of sensor artifacts appearing in a two-dimensional detection image of a scene, the method comprising:

at an image processor provided with a single two-dimensional detection image comprising a plurality of pixels, each of the pixels being associated with a scalar value representing a relative likelihood that a target is located in a subject pixel, the two-dimensional detection image and associated scalar values being the output of a detection filter for the target applied to a three-dimensional hyperspectral data cube representing a hyperspectral scene collected at a single time captured by a sensor:

determining mean of scalar values of a plurality of pixels in the two-dimensional detection image;

identifying sensor artifacts that appear as a plurality of striped columns in the two-dimensional detection image;

comparing scalar value of each pixel in a striped column with the mean of scalar values of the plurality of pixels in the two-dimensional detection image;

adjusting the scalar value of each pixel in the striped column based upon the comparing; and     reconstructing the two-dimensional detection image into a reconstructed two-dimensional detection image based upon the adjusted scalar value of each pixel, such that the reconstructed two-dimensional detection image shows a reduced effect of the sensor artifacts as compared to the two-dimensional detection image.

\* \* \* \* \*